June 27, 1972     E. R. MOORE ET AL     3,672,951
ROOFING STRUCTURE AND METHOD
Filed March 17, 1970
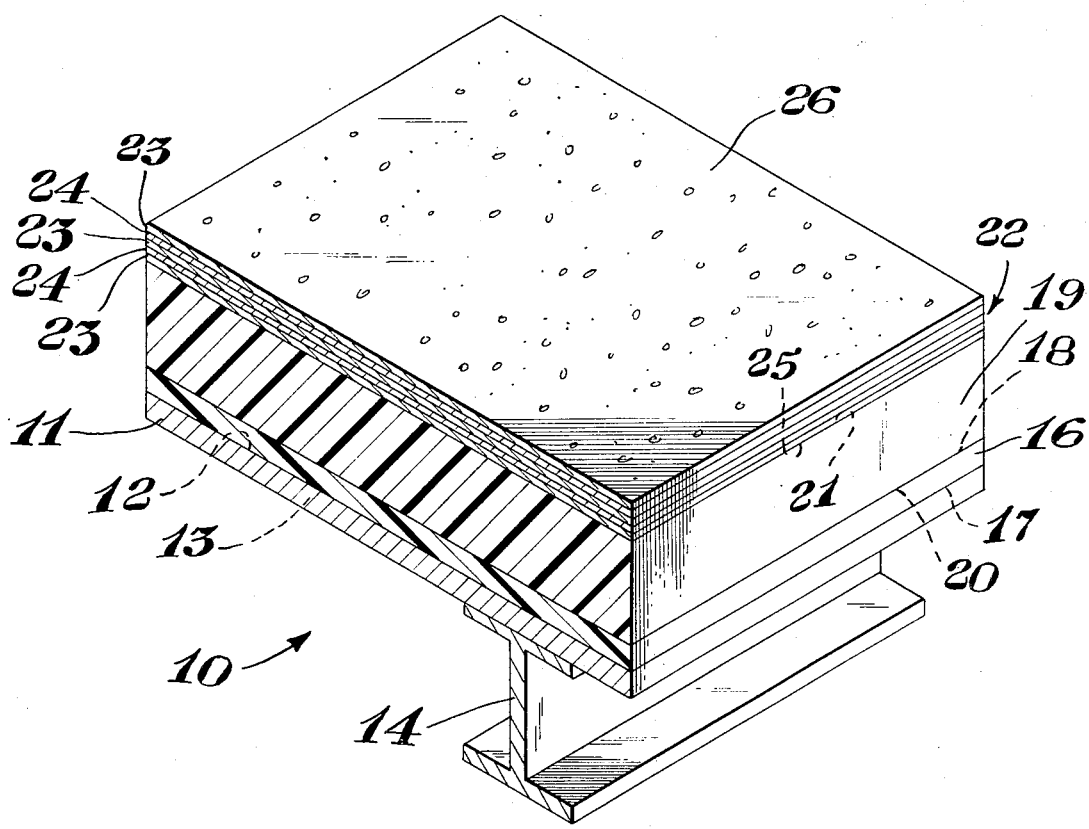
INVENTORS.
Eugene R. Moore
Marlin G. Bussey
Hal G. Parish
BY Robert B. Ingraham
AGENT

United States Patent Office 3,672,951
Patented June 27, 1972

3,672,951
ROOFING STRUCTURE AND METHOD
Eugene R. Moore, Marlin G. Bussey, and Hal G. Parish, Midland, Mich., assignors to The Dow Chemical Company, Midland, Mich.
Filed Mar. 17, 1970, Ser. No. 20,317
Int. Cl. B32b 5/18, 11/00; E04d 5/02
U.S. Cl. 161—160         2 Claims

ABSTRACT OF THE DISCLOSURE

Improved plastic foam insulated roof structures are prepared employing a generally constant composition copolymer of styrene and maleic anhydride containing from 15 to 35 weight percent maleic anhydride, the polymer having a solution viscosity of from about 3 to 12 centipoise (10 percent solution of the polymer in methylethylketone at 25° C.).

---

Plastic or synthetic resinous thermoplastic foam is employed in many cases for thermal insulation purposes with great benefit. Plastic foams because of high insulation value and light weight are desirably employed in the preparation of built-up roofs wherein the insulation material is light in weight and easily handled. Available foams and insulation materials for roof construction exhibit a wide variety of characteristics and in order to have a satisfactory roofing insulation, the insulation must have sufficient strength to permit handling and installation by professional roofers; the insulation must be resistant to heat and moisture and must also survive freezing conditions. Materials such as fiber board; that is, cellulosic boards of more or less randomly oriented fibers, tend to be relatively heavy, are resistant to damage on handling and do not collapse on the application of molten asphalt as an adhesive. Foamed polystyrene shows excellent resistance to water, is occasionally damaged during installation and has the disadvantage of requiring very careful application of the hot melt adhesive, such as asphalt, to prevent collapse and requires careful handling. Styrene-maleic anhydride foam, wherein the styrene and maleic anhydride are employed in equimolar proportions, shows excellent resistance to hot melt adhesives, but is susceptible to moisture permeation in the winter which reduces its heat resistance and often causes failure the following summer. Phenolic foams are light in weight and often are very brittle and are installed only with difficulty. Polyurethane foams often show sufficient moisture sensitivity to render them unsatisfactory for roofing applications.

It would be desirable if there was available an improved built-up roofing structure having a foamed plastic insulation wherein the foam plastic is simply and easily prepared.

It would also be desirable if the foam plastic insulating element of such a roof structure were moisture resistant, temperature resistant, had good dimensional stability and was readily installed.

It would also be desirable if there were available an improved method for the preparation of such a roof.

These benefits and other advantages in accordance with the present invention are achieved in a built-up roof structure, the roof structure comprising a roof deck having an upper face and a lower face, a synthetic resinous foam insulating body disposed generally adjacent the upper face of the roof deck, a water impermeable membrane affixed to the synthetic resinous foam removed from the roof deck the improvement which comprises the synthetic resinous thermoplastic insulating material being a copolymer of from about 85 to 65 weight percent styrene and from about 15 to 35 weight percent maleic anhydride, the insulation body forming a plurality of closed non-interconnecting gas-filled cells, the polymer having a solution viscosity of from about 3 to 12 centipoise, and advantageously from about 4 to 10 centipoise, the solution viscosity being the viscosity of a 10 weight percent solution of the polymer in methylethylketone at 25° C.

Also contemplated within the scope of the present invention is an improved method for the preparation of roofing structures wherein a built-up roof is installed by applying to an upper surface of a roof deck a hot melt adhesive, applying to the hot melt adhesive a cellular synthetic resinous foam structure, subsequently applying to the foam structure a plurality of alternating layers of asphalt roofing paper, the improvement which comprises employing as a foam plastic insulation a body of a polymer of from about 85 to 65 weight percent styrene and from about 15 to 35 weight the percent maleic anhydride chemically combined therein, the polymer having a solution viscosity from about 3 to 12 centipoise (the viscosity of a 10 weight percent solution in methylethylketone at 25° C.).

Further features and advantages of the preesnt invention will become more apparent from the following specification taken in connection with the drawing wherein the figure schematically depicts a sectional view of a roofing structure in accordance with the invention.

In the figure there is depicted a roof structure in accordance with the invention generally designated by the reference numeral 10. The roof structure 10 comprises a roof deck 11 having an upper surface 12 and a lower surface 13. Beneficially, the roof deck 11 may be of any desired material such as steel, cement, asbestos board, wood, glass reinforced plastics or the like. The roof deck 11 is carried by a supporting member 14. An adhesive layer 16 is affixed to the first or upper face 12 of the roof deck 11. The adhesive layer 16 beneficially is a single layer of asphalt or mastic, or alternately is a vapor barrier membrane built up of alternating layers of asphalt or bitumen and paper. The layer 16 has a lower face 17 and an upper face 18. An insulating member 19 is adhered to the face 18 and the insulating member 19 is a styrene-maleic anhydride copolymer hereinbefore described. The insulating member has a lower face 20 and an upper face 21. A barrier layer 22 is adhered to the upper face 21 of the foam layer 19. The barrier layer 22 comprises a plurality of layers of adhesive material 23 such as bitumen, asphalt or pitch having interleaved therewith a plurality of layers 24 of roofing paper to form a built-up water barrier. The barrier layer 22 has a lower face 25 adhered to the upper face 21 of the foam 19 and an exposed surface 26 comprising gravel and asphaltic or bituminous material adhering the gravel in place.

It is essential and critical to the practice of the present invention that the plastic or synthetic resinous foam employed be a copolymer of from about 85 to 65 weight percent styrene and from about 15 to 35 weight percent maleic anhydride. The polymeric mixture obtained by the batch polymerization of a mixture of monomer within the above mentioned range does not come within the scope of the present invention. For example: if styrene-maleic anhydride is batch polymerized employing 3 moles of styrene and one mole of maleic anhydride, the resultant product is a mixture of polystyrene roughly two parts by weight, and two parts by weight of a 1:1 mole ratio copolymer of styrene and maleic anhydride. Such a polymer is not suitable for practice of the present invention.

The present invention requires the use of the so-called uniform copolymers; that is, random polymers of styrene and maleic anhydride. One method of making such a uniform polymer is disclosed in U.S. Pat. 2,769,804, issued Nov. 6, 1956, to A. W. Hanson, which is herewith incorporated in its entirety by reference. It is essential that the solution viscosity of the polymer be between from about 3 to about 12 centipoise, the solution viscosity being the viscosity of a 10 weight percent solution of the uniform composition copolymer in methylethylketone at 25° C. The solution viscosity is somewhat indicative of molecular weight which can be controlled by polymerization temperature, catalyst concentration and like means well known to the art. The polymer solution is readily prepared by processes well known to the art, beneficially, heat plastification of the polymer admixture with suitable blowing agent such as dichlorodifluoromethane and extrusion into the desired form. One of many ways in which foam may be beneficially prepared from such a polymer is set forth in U.S. 2,740,157, issued Apr. 3, 1956, to J. L. McCurdy and C. E. De Long, herewith incorporated by reference thereto. During the process of extrusion or preparation of the foam, the solution viscosity of the polymer may be lowered due to degradation during processing. It should be emphasized that the polymer viscosity referred to herein is the viscosity of the polymer in the foam and not necessarily the polymer viscosity employed to form the foam. (The solution viscosity of the resin is reduced by extrusion or hot working generally in proportion to the temperature and shear conditions.) Most advantageously, foams for use in the present invention are prepared to provide foam having a polymer solution viscosity of from about 4 to 10 centipoise.

Roof structures in accordance with the present invention are readily prepared employing conventional fabrication techniques applicable to the preparation of built-up roofing employing foam insulation, such as polystyrene foam insulation. A wider latitude in the temperature of the asphalt or bitumen is permitted because of the substantially increased resistance to hot asphalt of the foam employed in the practice of the present invention. Suitable methods for preparation of a foam insulated roof are set forth in U.S. Pat. 3,211,597, issued Oct. 12, 1965, to J. P. Sheahan, and U.S. Pat. 3,094,447, issued June 18, 1963, to M. D. Chamberlain, both references being incorporated herewith by reference thereto.

By way of further illustration, a plurality of constant composition styrene-maleic anhydride copolymers are prepared employing the method and apparatus of the Hanson patent hereinbefore mentioned. The copolymers are the extruder is set forth in Table I under the heading "Gel Temperature, Extruder," and the temperature of the gel just prior to extrusion from the die is shown in the column headed "Gel Temperature, Cooler." The polymers were prepared to provide samples having roughly comparable solution viscosities.

TABLE I.—DEGRADATION OF 8 CENTIPOISE SOLUTION VISCOSITY OF STYRENE-MALEIC ANHYDRIDE COPOLYMER IN EXTRUSION PROCESS

| Sample No. | Maleic anhydride content, weight percent | Gel temperature, ° C. | | Solution viscosity in centipoise | |
|---|---|---|---|---|---|
| | | Extruder | Cooler | Before extrusion | After extrusion |
| 1 | 0 | 200 | 120 | | |
| 2 | 10 | 208 | 135 | 8.00 | 7.89 |
| 3 | 15 | 220 | 149 | 8.02 | 7.88 |
| 4 | 25 | 235 | 180 | 7.99 | 7.81 |
| 5 | 30 | 258 | 193 | 7.91 | 7.60 |
| 6 | 35 | 274 | 207 | 8.08 | 3.9 |
| 7 | 40 | 290 | 220 | 8.05 | 2.80 |
| 8 | 48 | 308 | 246 | 8.10 | 2.20 |

From the foregoing samples a plurality of boards are prepared. The boards are cut to planks 4 feet long, 8 inches wide and 2 inches thick. A ¼ inch thick layer of coal tar pitch having a temperature of about 350° F. is applied to each specimen. The edges of the board prior to applying the pitch are covered with masking tape. A portion of the masking tape extends upwardly to form a dike or dam to retain the pitch. The specimens are examined to determine their condition after the pitch has cooled. The results are set forth in Table II. A plurality of test panels are prepared from each of the foams of Table I and adhered to a roof deck, adjacent panels being sealed together with a vinyl foam weather strip. The panels are exposed for the months of December, January and February. During this period, the internal building temperatures range between 65 and 78° F., while the outdoor temperature varies from 65 to —15° F. The relative humidity inside the building varies from between 35 to 67 percent. The panels are weighed and placed in an oven at 220° F. for a period of 2 hours. (The 220° F. temperature represents the maximum temperature likely to be reached in a roof under a summer sun.) The temperature is raised in increments of 5° F. every 2 hours and each sample examined for distortion. Each panel is graded as P—no significant distortion, or F—failure. A panel which fails is removed from further testing. The results are set forth in Table II.

TABLE II

| Sample No. | Maleic anhydride [1] | Pitch test [2] | Weight gain | Failure temperature, ° F. | | | | | | | |
|---|---|---|---|---|---|---|---|---|---|---|---|
| | | | | 220 | 225 | 230 | 235 | 240 | 245 | 250 | 260 | 270 |
| 1 | 0 | Melted to ⅛ inch layer | <.5 | F | | | | | | | | |
| 2 | 10 | ½ melted through | <.5 | F | | | | | | | | |
| 3 | 15 | =1/32 inch melted | <.5 | P | P | P | P | P | P | F | | |
| 4 | 25 | No melting | <.5 | P | P | P | P | P | P | P | P | F |
| 5 | 30 | do | 1.0 | P | P | P | P | P | P | P | P | F |
| 6 | 35 | do | 2.1 | P | P | P | P | P | P | P | P | F |
| 7 | 40 | do | 5.8 | F | | | | | | | | |
| 8 | 48 | do | 10.0 | F | | | | | | | | |

[1] Weight percent.
[2] Coal tar pitch.

then foamed employing a 2.5 inch extruder and an extrusion rate of 100 pounds per hour and a blowing agent of about 80 parts by weight methyl chloride and 20 parts by weight dichlorodifluoromethane which is pumped into the extruder at a location between the feed port and the die using an arrangement substantially similar to that shown in the hereinbefore referred to McCurdy et al. patent. The various styrene-maleic anhydride constant composition copolymers are extruded to provide a foam having a density of about 2.3 pounds per cubic foot. Samples of the polymer are taken before and after extrusion. The temperature which the material reached in Foams having a moisture content greater than 4 percent are found unsatisfactory for most roofing applications.

A plurality of foam samples are prepared in the manner of the previous illustration, each of the samples containing 25 weight percent maleic anhydride and 75 weight percent styrene. The polymers each have differing solution viscosities. The polymers are extruded in the manner of the previous illustration to provide foams varying in density from 2 to 4 pounds per cubic foot. Flexural strengths are determined on each foam sample and the results are set forth in Table III.

TABLE III.—FLEXURAL STRENGTH OF FOAMS PRODUCED FROM 25% MALEIC ANHYDRIDE COPOLYMERS

| Sample No.: | Density[1] | Viscosity[2] | Flexural strength |
|---|---|---|---|
| 9 | 2 | 2 | 26 |
| 10 | 2 | 4 | 58 |
| 11 | 2 | 8 | 79 |
| 12 | 2 | 12 | 85 |
| 13 | 2.5 | 2 | 45 |
| 14 | 2.5 | 4 | 99 |
| 15 | 2.5 | 8 | 126 |
| 16 | 2.5 | 12 | 136 |
| 17 | 3.0 | 2 | 62 |
| 18 | 3.0 | 4 | 137 |
| 19 | 3.0 | 8 | 164 |
| 20 | 3.0 | 12 | 182 |
| 21 | 3.5 | 2 | 76 |
| 22 | 3.5 | 4 | 170 |
| 23 | 3.5 | 8 | 208 |
| 24 | 3.5 | 12 | 221 |
| 25 | 4.0 | 2 | 103 |
| 26 | 4.0 | 4 | 214 |
| 27 | 4.0 | 8 | 247 |
| 28 | 4.0 | 12 | 259 |

[1] Pounds per cubic foot.
[2] Centipoise per square inch.

Portions of the foam prepared in the two previous illustrations (Samples 1–13) are employed in a roof prepared of a steel roof deck. The foam panels are adhered to the roof deck with asphalt and coated with asphalt. The polystyrene panel exhibits immediate failure from contact with the hot asphalt, and distortion of the sample containing 10 weight percent maleic anhydride is sufficiently severe that the panels are immediately removed from further testing. The remaining panels are subsequently coated with three layers of 30 pound roofing felt, a coating of asphalt and pea gravel. Samples 9 and 13 show severe mechanical damage due to handling. Sample 10 shows some damage but is useable.

For roofing purposes, the foams with densities in excess of 3 pounds per cubic foot are impractical due to prohibitive costs. After exposure of one year, the remaining samples are found satisfactory except for those containing 40 and 48 weight percent maleic anhydride. Due to moisture accumulation in the foam, some evidence of frost damage is apparent.

Built-up roofs in accordance with the present invention have been found eminently satisfactory.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A built-up roof structure, the roof structure comprising
    a roof deck having
        an upper face and
        a lower face,
    a synthetic resinous foam insulating body disposed generally adjacent the upper face of the roof deck and adhered thereto,
    a water impermeable membrane adhesively affixed to the synthetic resinous foam remote from the roof deck, the improvement which comprises
    the synthetic resinous thermoplastic insulating material being a copolymer of from about 85 to 65 weight percent styrene and from about 15 to 35 weight percent maleic anhydride, the insulation body forming a plurality of closed non-interconnecting gas-filled cells, the polymer having a solution viscosity of from about 3 to 12 centipoise, the solution viscosity being the viscosity of a 10 weight percent solution of the polymer in methylethylketone at 25° C.

2. The roof structure of claim 1 wherein the polymer has a solution viscosity of from about 4 to 10 centipoise.

References Cited

UNITED STATES PATENTS

| 3,411,967 | 11/1968 | Rowland et al. | 161—161 |
| 3,492,196 | 1/1970 | Moore | 161—160 |
| 3,499,819 | 3/1970 | Lewis | 161—216 |

WILLIAM J. VAN BALEN, Primary Examiner

U.S. Cl. X.R.

52—309; 156—71, 278, 321; 161—161